(12) United States Patent
Wang

(10) Patent No.: US 6,923,487 B1
(45) Date of Patent: Aug. 2, 2005

(54) PET FENCE IN VEHICLES

(76) Inventor: Chiu-Kuei Wang, No. 42, 4 Lin, Shin-Fuh Lee, Yuan-Li Town, Miao-Lih Hsien (TW)

( * ) Notice: Subject to any disclaimer, the term of this patent is extended or adjusted under 35 U.S.C. 154(b) by 0 days.

(21) Appl. No.: 10/756,324

(22) Filed: Jan. 14, 2004

(51) Int. Cl.$^7$ .............................................. B62D 33/04
(52) U.S. Cl. ............................... 296/24.31; 296/24.46; 119/771
(58) Field of Search .......................... 296/24.31, 24.4, 296/24.43, 24.46, 1.09; 119/712, 771; 297/411.21

(56) References Cited

U.S. PATENT DOCUMENTS

| | | | |
|---|---|---|---|
| 2,982,579 A * | 5/1961 | Greenwald | 296/24.4 |
| 2,998,279 A * | 8/1961 | Mateny | 296/24.43 |
| 3,044,800 A * | 7/1962 | Wicker | 296/24.43 |
| 3,190,686 A * | 6/1965 | Smiler | 296/24.46 |
| 3,190,687 A * | 6/1965 | Johnson | 296/24.46 |
| 3,367,707 A * | 2/1968 | Merriweather | 296/24.43 |
| 4,907,835 A * | 3/1990 | Salters | 296/1.09 |
| 2003/0057722 A1 * | 3/2003 | Dolman | 296/24.1 |

* cited by examiner

*Primary Examiner*—Lori L. Coletta
(74) *Attorney, Agent, or Firm*—Rosenberg, Klein & Lee

(57) ABSTRACT

A pet fence in a vehicle includes two first bars and a second bar located between the two first bars. The first bars and the second bar are connected by two transverse bars. Each first bar has an open top and a leg portion located opposite to the open top and extending outward. A top portion has three extensions which are retractably inserted in the open tops of the two first bars and the open top of the second bar. The three extensions can be secured in position by fastening members on the first bars and the second bar. An adjusting rod is movably secured to one of the three extensions and a disk is connected to a distal end of the adjusting rod. The disk may contact against the ceiling of the vehicle.

3 Claims, 7 Drawing Sheets

PET FENCE IN VEHICLES

FIELD OF THE INVENTION

The present invention relates to a pet fence located between the driver seat and the front passenger seat, and includes a ceiling member to secure the fence.

BACKGROUND OF THE INVENTION

A conventional pet fence used between the driver seat 52 and the front passenger seat 53 of a vehicle 50 is shown in FIGS. 1 and 2 and generally includes two first bars 60 and each of which has an open top and a leg portion 600 located opposite to the open top and extending outward. A second bar 70 is located between the two first bars 60 and two transverse bar 80 are used to connect the first bars 60 and the second bar 70 together. The second bar 70 includes an open top. An E-shaped top portion 90 includes three extensions which are respectively inserted in the three open tops of the first bars 60 and the second bar 70. The top portion 90 can be extended upward to close the opening between the two seats 52, 53 and the ceiling 51 of the vehicle 50. The two leg portions 600 stand on the floor of the vehicle 50. Two ropes 601 tie the two first bars 60 and the head-rest support rods 521, 531 extending from the two seats 52, 53. The conventional pet fence cannot be positioned securely and often falls and shakes by impact from the pets on the back-seat area.

The present invention intends to provide a pet fence that includes a ceiling member which is retractably connected to the second bar and the ceiling member includes a large-area disk to contact against the ceiling so as to provide the pet fence a better positioning feature.

SUMMARY OF THE INVENTION

The present invention relates to a pet fence which comprises two first bars, a second bar located between the first bars and a top portion connected on the two first bars and the second bar. Each first bar has an open top and a leg portion which is located opposite to the open top and extends outward. A first fastening member is rotatably mounted to the open top of each of the first bar. Two transverse bars connect the first bars and the second bar together. A second fastening member is rotatably mounted to the open top of the second bar. The top portion has three extensions which are retractably inserted in the open tops of the two first bars and the open top of the second bar. The first fastening members and the second fastening member respectively secure the three extensions relative to the first bars and the second bar. An adjusting rod is movably secured in one of the three extensions and a disk is connected to a distal end of the adjusting rod.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
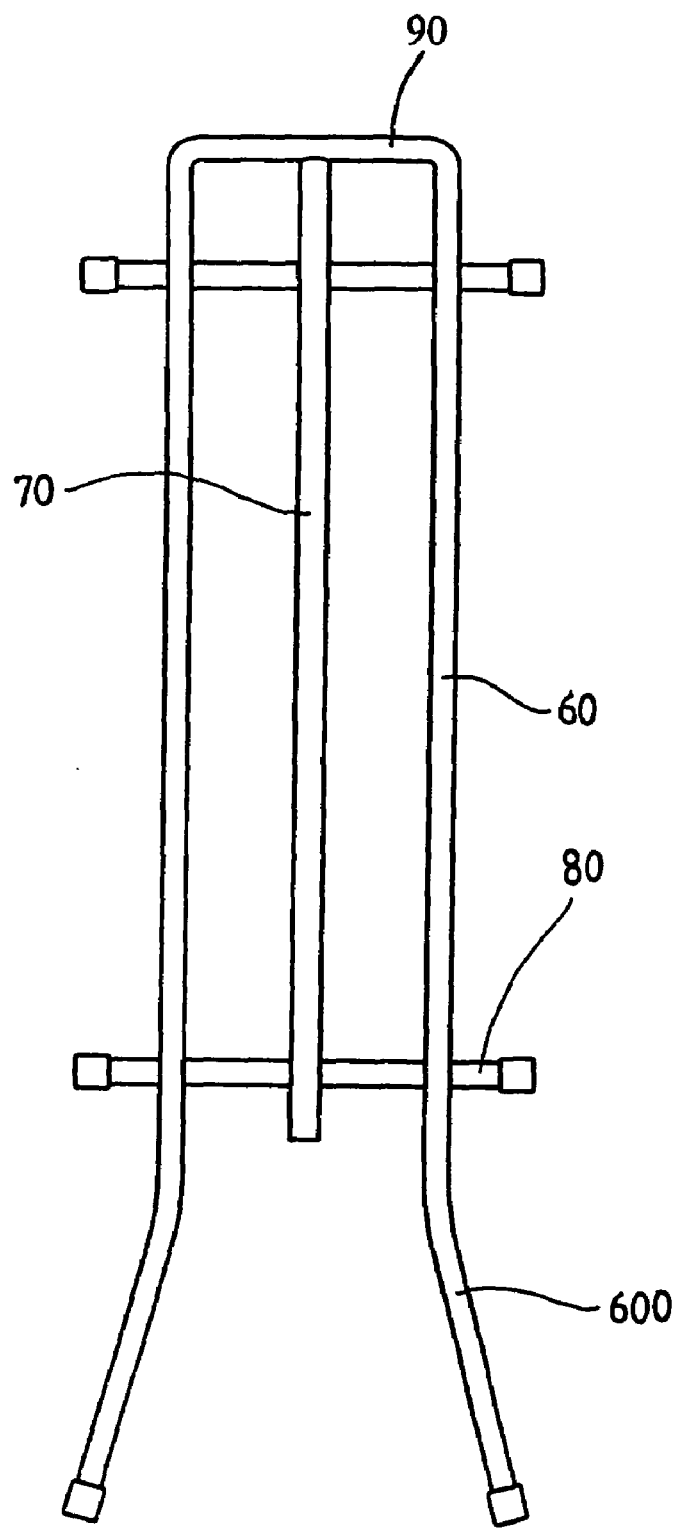
FIG. 1 shows a conventional pet fence.
Figure 2:
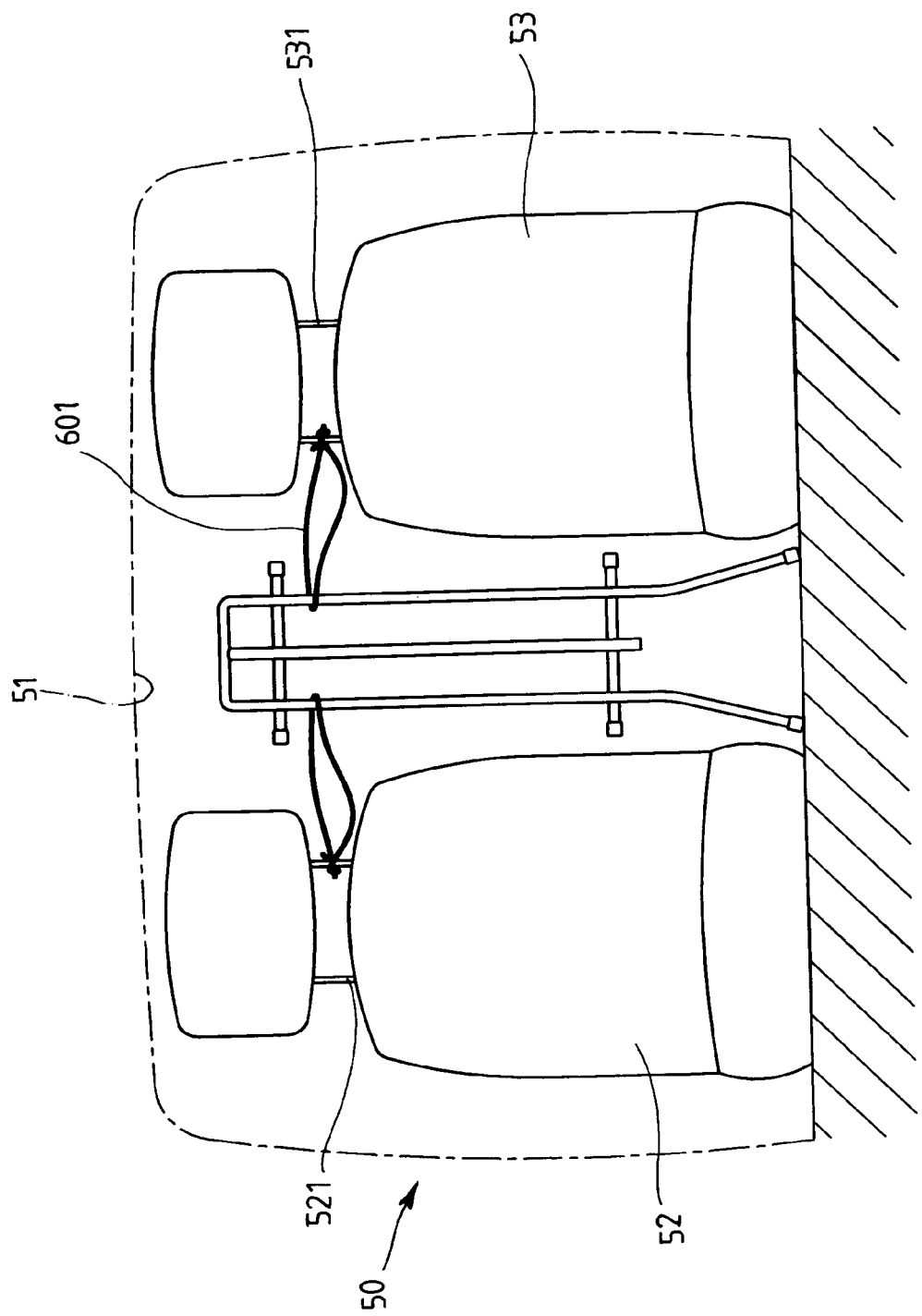
FIG. 2 shows the conventional pet fence used between the driver seat and front passenger seat.
Figure 3:
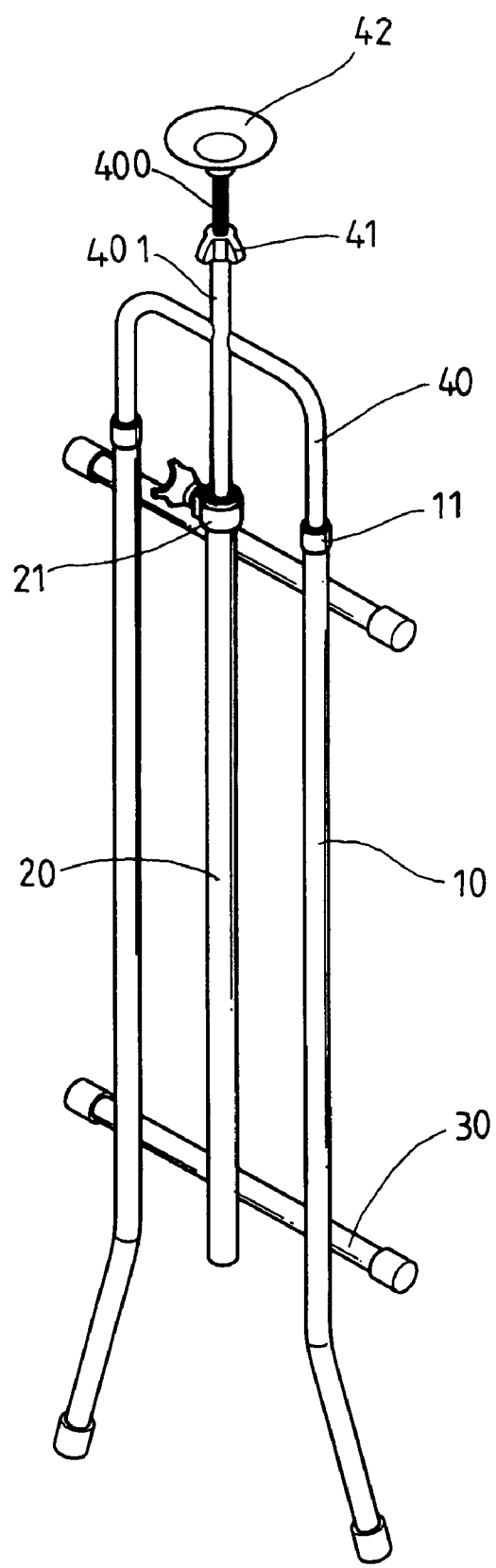
FIG. 3 is a perspective view to show the pet fence of the present invention.
Figure 4:
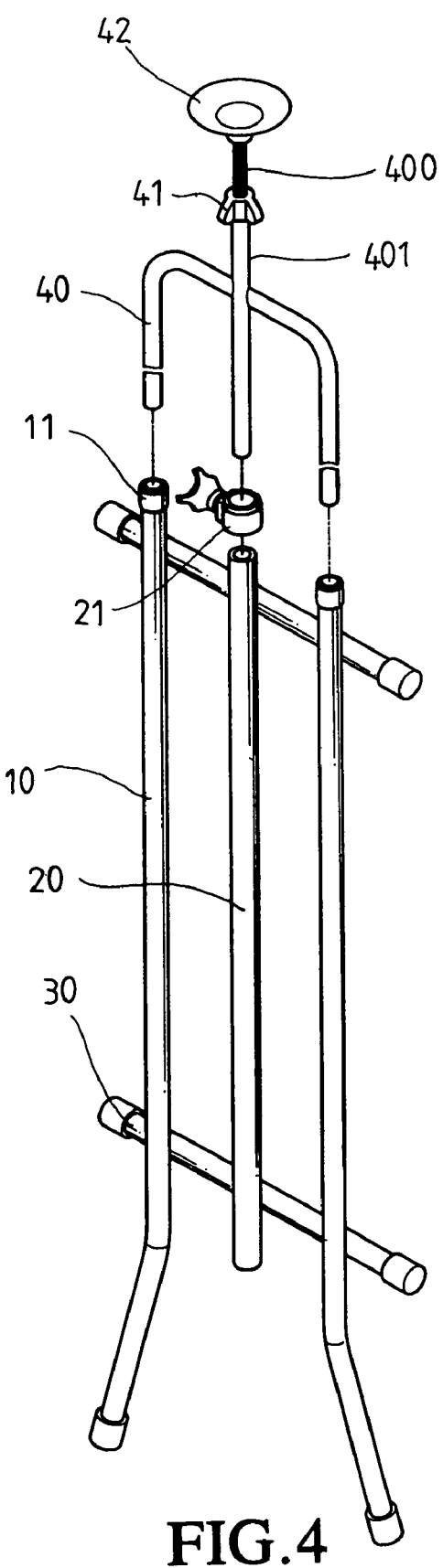
FIG. 4 is an exploded view to show the top portion and the main fence of the pet fence of the present invention.
Figure 7:
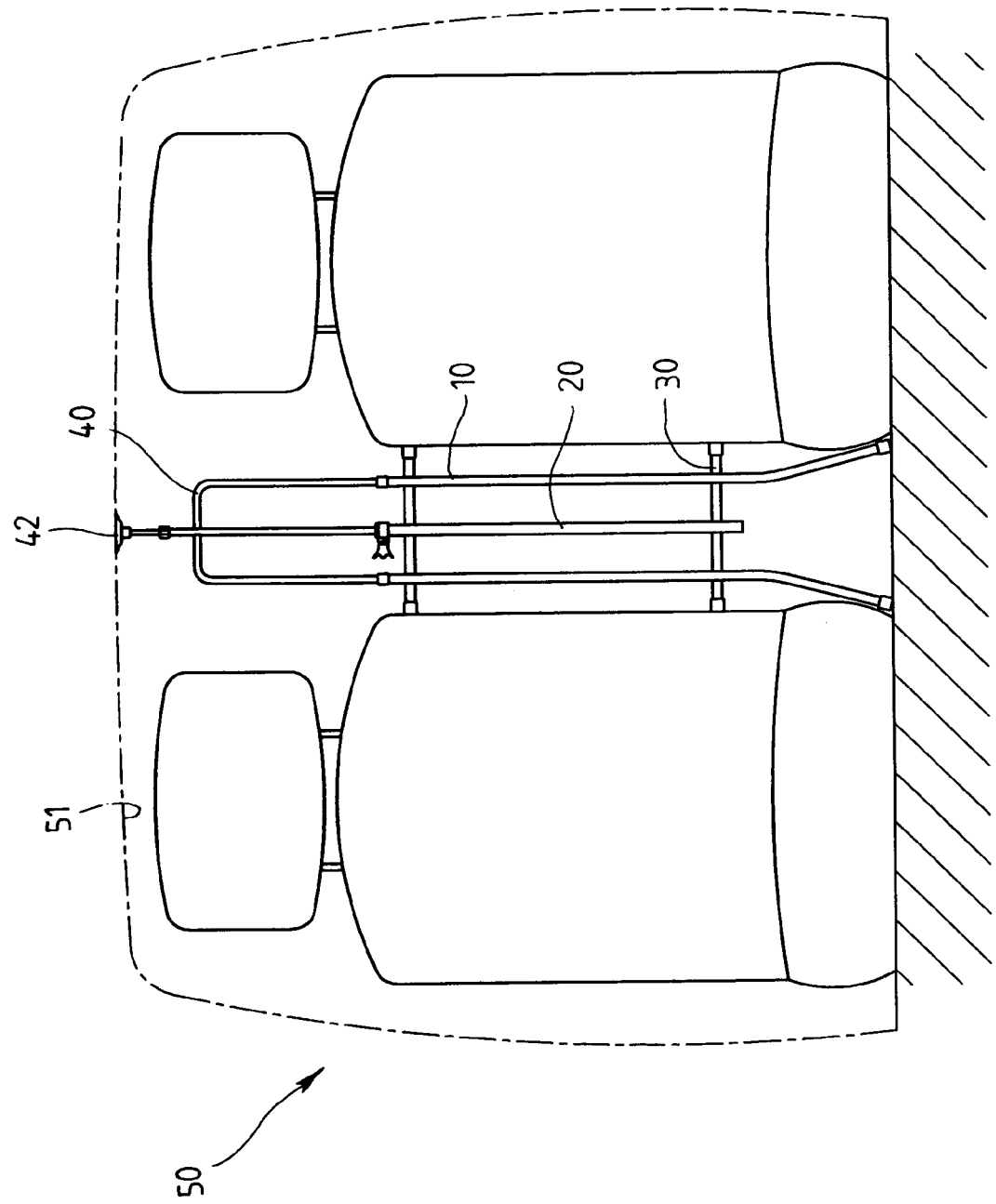
FIG. 7 shows the pet fence of the present invention used in a vehicle.

Referring to FIGS. 3, 4 and 7, the pet fence of the present invention comprises two first bars 10 and each first bar 10 has an open top and a leg portion which is located opposite to the open top and extends outward so that the leg portions stand on the floor in a vehicle 50 as shown in FIG. 7. A first fastening member 11 is rotatably mounted to the open top of each of the first bar 10.

A second bar 20 is located between the two first bars 10 and two transverse bars 30 connect the first bars 10 and the second bar 20 together to obtain a main fence. A second fastening member 21 is rotatably mounted to the open top of the second bar 20 and includes a locking bolt extending radially through the second fastening member 21.

Figure 5:
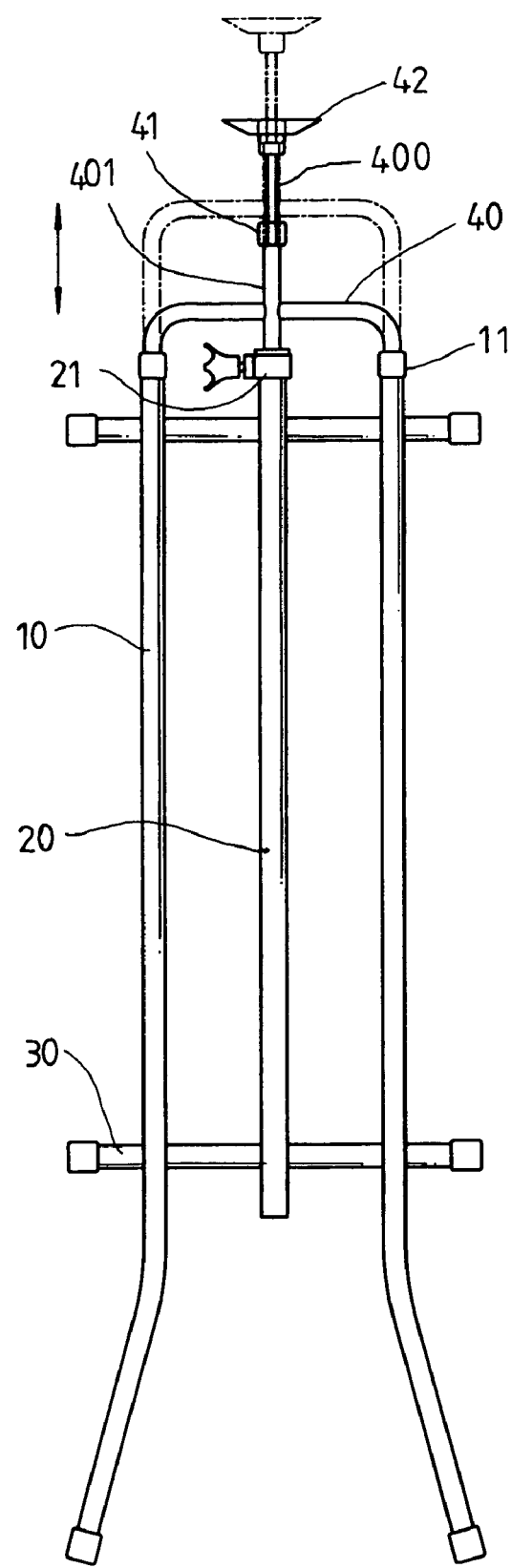
FIG. 5 shows that the top portion can be adjusted relative to the main fence of the pet fence of the present invention.

A top portion has three extensions 40 which are retractably inserted in the open tops of the two first bars 10 and the open top of the second bar 20 respectively. The first fastening members 11 and the second fastening member 21 then respectively secure the three extensions relative to the first bars 10 and the second bar 20. In other words, the top portion can be positioned higher as shown in FIG. 5 by operation of the first fastening members 11 and the second fastening member 21.

Figure 6:
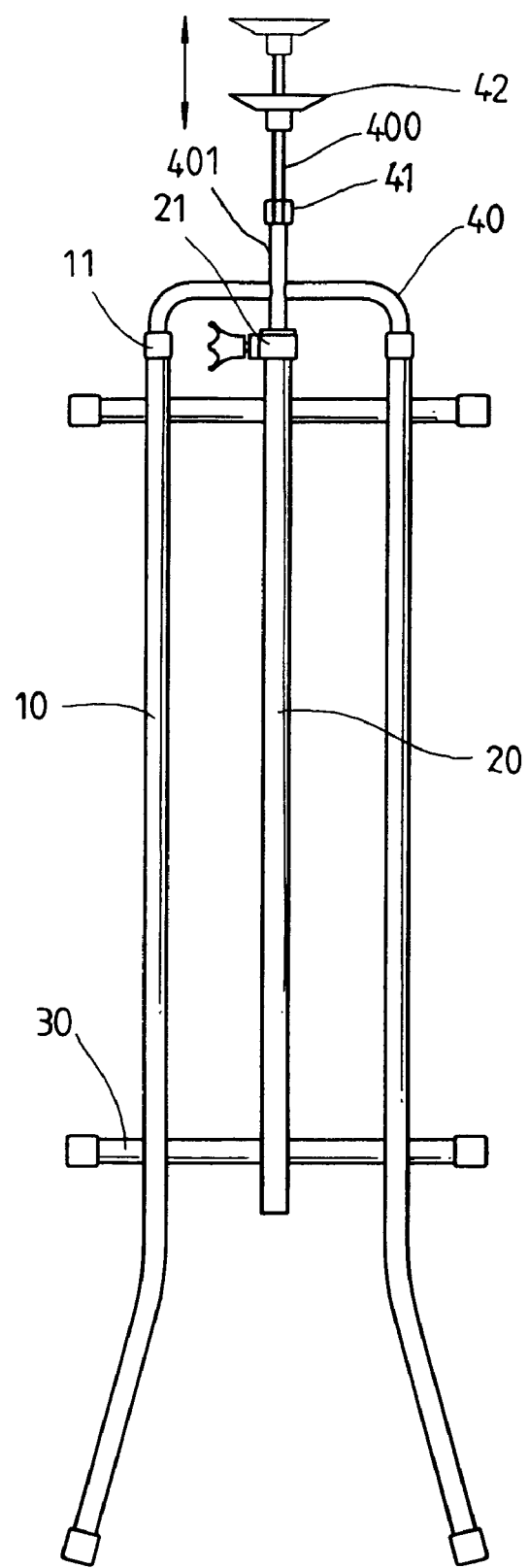
FIG. 6 shows that the adjusting rod and the disk can be adjusted relative to the top portion of the pet fence of the present invention.

A tube 401 is integrally connected to a middle one of the three extensions 40 and a third fastening member 41 is rotatably mounted to the tube 401. An adjusting rod 400 is threadedly connected to the tube 401 and can be positioned by the third fastening member 41. A disk 42 is connected to a distal end of the adjusting rod 400 so as to contact against the ceiling 51 of the vehicle 50 as shown in FIG. 7 It is noted that the user may adjust the adjusting rod 400 individually as shown in FIG. 6 such that the user still have a larger space between the ceiling 51 and the top portion.

The adjusting rod 400 is adjusted such that the disk 42 contacts against the ceiling 51 so hard and the reaction force push the leg portions to firmly stand on the floor. By this way, the pet fence is well positioned and no ropes needed.

While we have shown and described the embodiment in accordance with the present invention, it should be clear to those skilled in the art that further embodiments may be made without departing from the scope of the present invention.

What is claimed is:

1. A pet fence comprising:

two first bars and each first bar having an open top and a leg portion located opposite to the open top and extending outward, a first fastening member rotatably mounted to the open top of each of the first bar;

a second bar located between the two first bars and two transverse bars connecting the first bars and the second bar together, a second fastening member rotatably mounted to the open top of the second bar;

a top portion having three extensions which are respectively and retractably inserted in the open tops of the two first bars and the open top of the second bar, the first fastening members and the second fastening member respectively secure the three extensions relative to the first bars and the second bar; and an adjusting rod movably secured to one of the three extensions and a disk connected to a distal end of the adjusting rod.

2. The fence as claimed in claim 1, wherein a tube is integrally connected to a middle one of the three extensions and the adjusting rod is threadedly connected to the tube.

3. The fence as claimed in claim 2, wherein a third fastening member is rotatably mounted to the tube so as to fasten the adjusting rod in position.

* * * * *